(12) United States Patent
Choi

(10) Patent No.: US 11,459,685 B2
(45) Date of Patent: Oct. 4, 2022

(54) LAUNDRY TREATMENT DEVICE

(71) Applicant: LG ELECTRONICS INC., Seoul (KR)

(72) Inventor: Moonsuk Choi, Seoul (KR)

(73) Assignee: LG Electronics Inc., Seoul (KR)

( * ) Notice: Subject to any disclaimer, the term of this patent is extended or adjusted under 35 U.S.C. 154(b) by 420 days.

(21) Appl. No.: 16/608,005

(22) PCT Filed: Apr. 24, 2018

(86) PCT No.: PCT/KR2018/004707
§ 371 (c)(1),
(2) Date: Oct. 24, 2019

(87) PCT Pub. No.: WO2018/199581
PCT Pub. Date: Nov. 1, 2018

(65) Prior Publication Data
US 2021/0102327 A1 Apr. 8, 2021

(30) Foreign Application Priority Data

Apr. 24, 2017 (KR) .................. 10-2017-0052425

(51) Int. Cl.
*D06F 23/02* (2006.01)
*D06F 33/48* (2020.01)
(Continued)

(52) U.S. Cl.
CPC ............ *D06F 33/48* (2020.02); *D06F 23/025* (2013.01); *D06F 37/265* (2013.01); *D06F 37/36* (2013.01); *D06F 34/16* (2020.02); *D06F 37/225* (2013.01); *D06F 2103/24* (2020.02); *D06F 2103/26* (2020.02); *D06F 2103/68* (2020.02); *D06F 2105/48* (2020.02); *F16F 15/002* (2013.01);
(Continued)

(58) Field of Classification Search
None
See application file for complete search history.

(56) References Cited

FOREIGN PATENT DOCUMENTS

JP 2016198248 12/2016
KR 1020050062792 6/2005
(Continued)

OTHER PUBLICATIONS

Kim, "KR101171315B1 English machine translation.pdf", Aug. 7, 2012—Machine translation from Espacenet.com.*
(Continued)

*Primary Examiner* — Levon J Shahinian
(74) *Attorney, Agent, or Firm* — Fish & Richardson P.C.

(57) ABSTRACT

The present invention relates to a laundry treating apparatus. The laundry treating apparatus according to an embodiment of the present invention includes a control unit which controls the tub to rotate at a first speed in a case of a blanket dehydration mode, to rotate at a second speed lower than the first speed so that the plurality of balls are dispersed when amount of eccentricity in the first speed rotation is equal to or greater than a first reference value, and to rotate at a third speed higher than the first speed when the amount of eccentricity in the first speed rotation is less than the first reference value. Accordingly, in a blanket dehydration mode, it is possible to stably perform dehydration by preventing the plurality of balls from operating unbalanced.

16 Claims, 12 Drawing Sheets

(51) Int. Cl.
  *D06F 34/16*   (2020.01)
  *D06F 37/22*   (2006.01)
  *D06F 37/26*   (2006.01)
  *D06F 37/36*   (2006.01)
  *F16F 15/00*   (2006.01)
  *F16F 15/36*   (2006.01)
  *D06F 105/48*  (2020.01)
  *D06F 103/26*  (2020.01)
  *D06F 103/24*  (2020.01)
  *D06F 103/68*  (2020.01)

(52) U.S. Cl.
  CPC ......... *F16F 15/363* (2013.01); *F16F 2222/08* (2013.01); *F16F 2232/02* (2013.01); *F16F 2234/08* (2013.01)

(56) References Cited

FOREIGN PATENT DOCUMENTS

| | | |
|---|---|---|
| KR | 1020090080608 | 7/2009 |
| KR | 1020110014433 | 2/2011 |
| KR | 101171315 | 7/2012 |

OTHER PUBLICATIONS

PCT International Search Report in International Appln. No. PCT/KR2018/004707, dated Apr. 27, 2018, 5 pages (with English translation).

* cited by examiner

LAUNDRY TREATMENT DEVICE

CROSS-REFERENCE TO RELATED APPLICATIONS

This application is a National Stage application under 35 U.S.C. § 371 of International Application No. PCT/KR2018/004707, filed on Apr. 24, 2018, which claims the benefit of Korean Application No. 10-2017-0052425, filed on Apr. 24, 2017. The disclosures of the prior applications are incorporated by reference in their entirety.

TECHNICAL FIELD

The present invention relates to a laundry treating apparatus, and more particularly, to a laundry treating apparatus for stably performing dehydration by preventing a plurality of balls from being unbalanced in a blanket dehydration mode.

BACKGROUND ART

Generally, a laundry treating apparatus does the washing by using a friction force between a tub rotated by receiving a driving force of a motor and a laundry in a state where detergent, washing water, and laundry are put in a tub. Thus, there is a washing effect that the laundry is little damaged and the laundry is not tangled with each other. Meanwhile, in order to improve the eccentricity of the laundry treating apparatus, a ball balance is used. However, such a ball balance is effective when there is a load variation in the tub, and there is a problem that a plurality of balls are unbalanced in a blanket dehydration mode in which there is little load variation in the tub.

DISCLOSURE

Technical Problem

An object of the present invention is to provide a laundry treating apparatus for stably performing dehydration by preventing a plurality of balls from being unbalanced in a blanket dehydration mode.

Technical Solution

A laundry treating apparatus according to an embodiment of the present invention for achieving the above object includes a control unit which controls the tub to rotate at a first speed in a case of a blanket dehydration mode, to rotate at a second speed lower than the first speed so that the plurality of balls are dispersed when amount of eccentricity in the first speed rotation is equal to or greater than a first reference value, and to rotate at a third speed higher than the first speed when the amount of eccentricity in the second speed rotation is less than or equal to a second reference value.

The control unit according to an embodiment of the present invention controls the plurality of balls to rotate at the third speed of the tub, in a state in which the plurality of balls are dispersed.

The control unit according to an embodiment of the present invention increases the speed of the tub to pass through a transient resonance section, in a state in which the plurality of balls are dispersed.

The control unit according to an embodiment of the present invention controls the tub to stop, when vibration amount of the tub detected by the vibration detection unit is greater than or equal to a third reference value, during the third speed rotation, and to rotate at a fourth speed higher than the third speed, when the vibration amount of the tub detected by the vibration detection unit is less than the third reference value.

The control unit according to an embodiment of the present invention calculates cloth amount in the tub in a case of the blanket dehydration mode, controls the tub to rotate at a second speed lower than the first speed so that the plurality of balls are dispersed, when the cloth amount is less than or equal to a certain value and the amount of eccentricity in the first speed rotation is greater than or equal to the first reference value, and to rotate at a third speed higher than the first speed when the amount of eccentricity in the second speed rotation is less than or equal to the second reference value.

The control unit according to an embodiment of the present invention calculates the amount of eccentricity in the first speed rotation, and calculates the cloth amount before the calculation of the amount of eccentricity.

The control unit according to an embodiment of the present invention rotates the tub at the first speed, before the calculation of the amount of eccentricity, and calculates the cloth amount, during the first speed rotation.

The control unit according to an embodiment of the present invention rotates the tub at the first speed so that the cloth is attached to the tub.

The control unit according to an embodiment of the present invention controls the tub to rotate at the first speed in a case of the blanket dehydration mode, and to rotate at a third speed higher than the first speed, when the amount of eccentricity in the first speed rotation is less than the first reference value.

The control unit according to an embodiment of the present invention controls the tub to rotate at the first speed in a case of a normal dehydration mode, and to rotate at a third speed higher than the first speed, when the amount of eccentricity in the first speed rotation is equal to or less than an allowable value.

A laundry treating apparatus according to another embodiment of the present invention for achieving the above object includes a control unit which controls the tub to rotate at a first speed in a case of a blanket dehydration mode, to rotate at a second speed lower than the first speed so that the plurality of balls are dispersed when amount of eccentricity in the first speed rotation is equal to or greater than a first reference value, and to rotate at a third speed higher than the first speed when the amount of eccentricity in the first speed rotation is less than the first reference value.

The control unit according to another embodiment of the present invention controls to rotate at the third speed higher than the first speed when the amount of eccentricity in the second speed rotation is equal to or less than a second reference value, and controls to rotate at a fourth speed higher than the third speed when vibration amount of the tub detected by the vibration detection unit is less than a third reference value.

The control unit according to another embodiment of the present invention control the plurality of balls to rotate at the third speed of the tub, in a state in which the plurality of balls are dispersed.

The control unit according to another embodiment of the present invention increases the speed of the tub to pass through a transient resonance section, in a state in which the plurality of balls are dispersed.

Advantageous Effects

The laundry treating apparatus according to an embodiment of the present invention includes a control unit which controls the tub to rotate at a first speed in a case of a blanket dehydration mode, to rotate at a second speed lower than the first speed so that the plurality of balls are dispersed when amount of eccentricity in the first speed rotation is equal to or greater than a first reference value, and to rotate at a third speed higher than the first speed when the amount of eccentricity in the second speed rotation is less than or equal to a second reference value, so that the plurality of balls are not operated unbalanced in the blanket dehydration mode, thereby stably performing dehydration.

Particularly, the control unit according to an embodiment of the present invention controls the plurality of balls to rotate at the third speed of the tub, in a state in which the plurality of balls are dispersed, so that the plurality of balls are not operated unbalanced, thereby stably performing dehydration.

Particularly, the control unit according to an embodiment of the present invention increases the speed of the tub to pass through a transient resonance section, in a state in which the plurality of balls are dispersed, so that the plurality of balls are not operated unbalanced, thereby stably performing dehydration.

Accordingly, it is possible to prevent a short circuit phenomenon in which the tub is stopped due to the excessive vibration in the transient resonance section.

As a result, the dehydration time in the blanket dehydration mode can be reduced.

The laundry treating apparatus according to another embodiment of the present invention includes a control unit which controls the tub to rotate at a first speed in a case of a blanket dehydration mode, to rotate at a second speed lower than the first speed so that the plurality of balls are dispersed when amount of eccentricity in the first speed rotation is equal to or greater than a first reference value, and to rotate at a third speed higher than the first speed when the amount of eccentricity in the first speed rotation is less than the first reference value, so that the plurality of balls are not operated unbalanced in the blanket dehydration mode, thereby stably performing dehydration.

MODE FOR INVENTION

Figure 1:
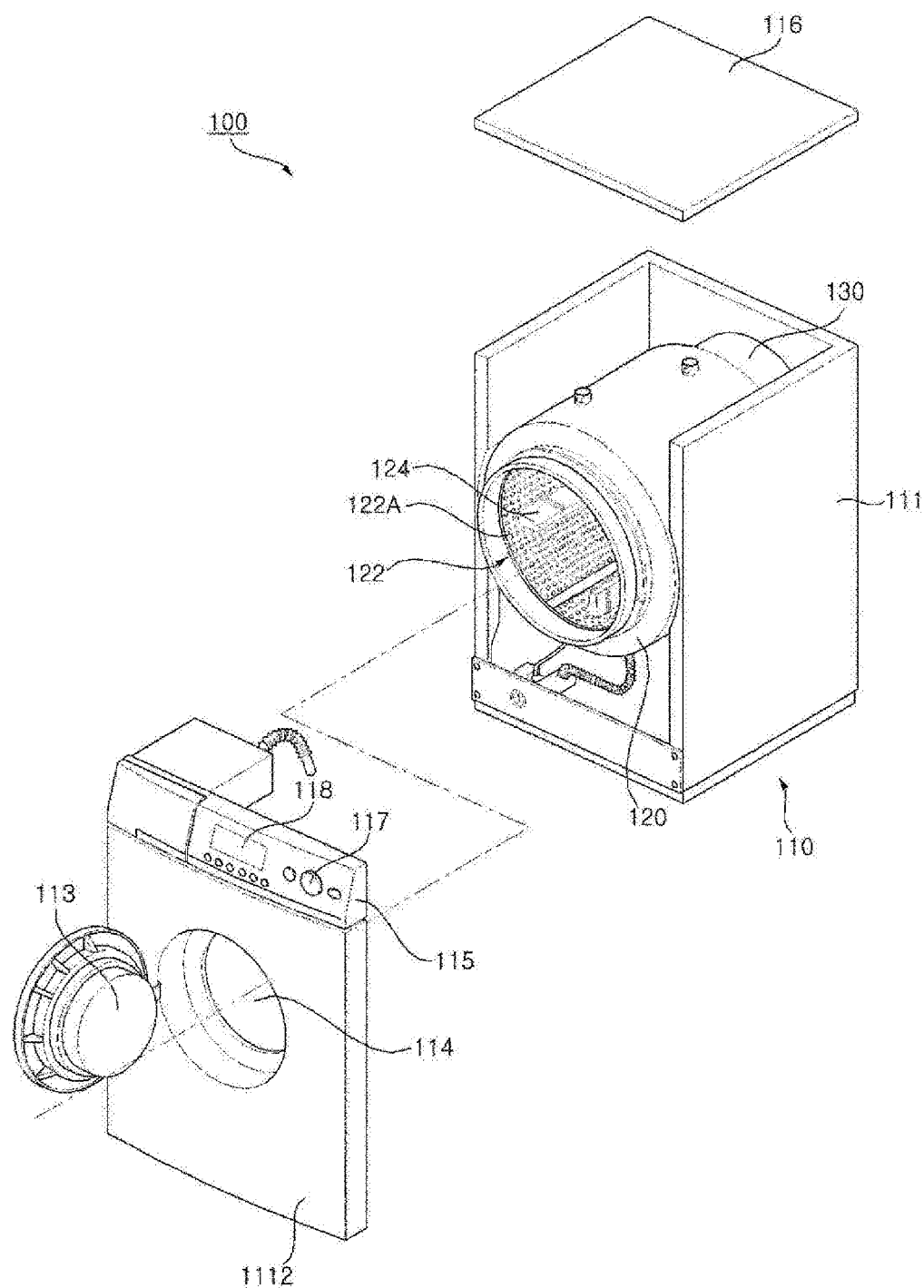
FIG. 1 is a perspective view showing a laundry treating apparatus according to an embodiment of the present invention.

Hereinafter, preferred embodiments of the present invention will be described with reference to the accompanying drawings. In describing the present embodiment, the same designations and the same reference numerals are used for the same components, and further description thereof will be omitted.

FIG. 1 is a perspective view showing a laundry treating apparatus according to an embodiment of the present invention. Referring to FIG. 1, the laundry treating apparatus 100 according to an embodiment of the present invention is a laundry treating apparatus of a front load type in which cloth is inserted, toward a front, into a tub.

Referring to the drawings, the laundry treating apparatus 100 is a drum-type laundry treating apparatus, and includes a casing 110 forming an outer shape of the laundry treatment apparatus 100, a tub 120 which is disposed inside the casing 110 and supported by the casing 110, a drum 122 which is disposed inside the tub 120 and is a washing tub where cloth is washed, a motor 130 for driving the drum 122, a washing water supply unit (not shown) which is disposed outside a cabinet body 111 and supplies washing water into the casing 110, and a drainage unit (not shown) which is formed in the lower side of the tub 120 and discharges the washing water to the outside.

A plurality of through holes 122A are formed in the drum 122 to allow the washing water to pass therethrough, and a lifter 124 may be disposed on an inner side surface of the drum 12 so that the laundry is lifted to a certain height when the drum 122 is rotated and then falls due to gravity.

The casing 110 includes a cabinet main body 111, a cabinet cover 112 disposed in and coupled to the front surface of the cabinet body 111, a control panel 115 disposed in the upper side of the cabinet cover 112 and coupled to the cabinet body 111, and a top plate 116 disposed in the upper side of the control panel 115 and coupled to the cabinet body 111.

The cabinet cover 112 includes a cloth loading hole 114 formed to allow the cloth to enter and exit, and a door 113 disposed to be rotatable from side to side to allow the cloth loading hole 114 to be opened and closed.

The control panel 115 includes operation keys 117 for operating the operation state of the laundry treating apparatus 100, and a display 118 which is disposed in one side of the operation keys 117 and displays an operation state of the laundry treating apparatus 100.

The operation keys 117 and the display 118 in the control panel 115 are electrically connected to a control unit (not shown), and the control unit (not shown) electrically controls each component, and the like of the laundry treating apparatus 100. The operation of the control unit (not shown) is omitted with reference to the operation of the control unit 210 of FIG. 4.

Meanwhile, the drum 122 may be provided with an auto balance. An auto balancer is used to reduce vibration generated according to the amount of eccentricity of laundry accommodated in the drum 122, and may be implemented as a liquid balancer, a ball balancer, or the like.

Meanwhile, although not shown, the laundry treating apparatus 100 may further include a vibration detection unit (197 of FIG. 2) that measures the vibration amount of the drum 122 or the vibration amount of the casing 110.

Figure 2:
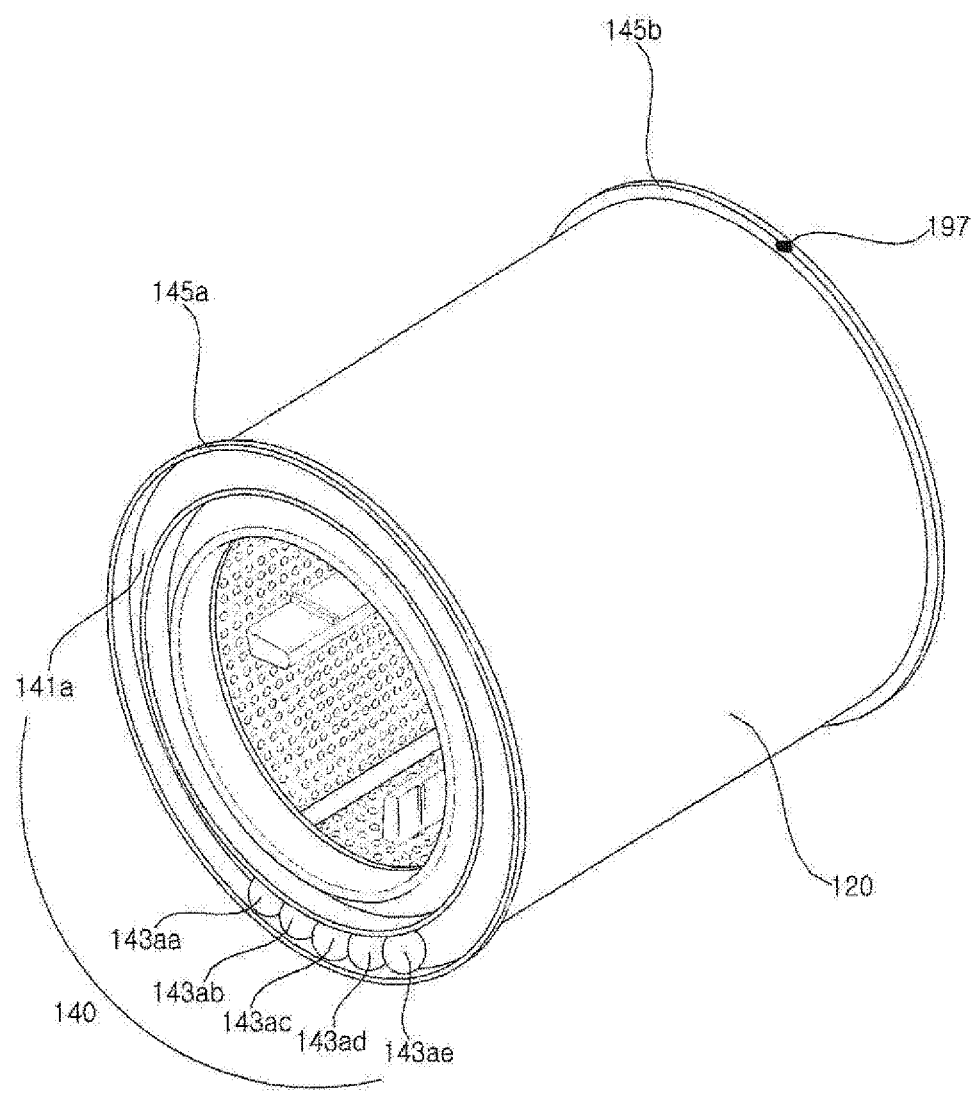
FIG. 2 is a diagram showing a ball balancer formed in one side of a tub of FIG. 1.

FIG. 2 is a diagram showing a ball balancer formed in one side of the tub of FIG. 1.

Referring to the drawings, the laundry treating apparatus 100 may be provided with a ball balancer 140 which is disposed in at least one side of the tub 120, and has a plurality of balls 143aa to 143ae, and a guide part 141a for guiding the movement of the plurality of balls 143aa to 143ae.

In the drawing, it is illustrated that the ball balancer 140 is positioned in a first side end part 145a in the direction of the door 113 among both side end parts 145a and 145b of the tub 120.

When the tub 120 rotates, the plurality of balls 143aa to 143ae inside the guide part 141a move in the opposite direction to the moving direction of the cloth inside the tub 120, thereby serving to improve the unbalance of the tub 120.

Meanwhile, although not shown in the drawing, the ball balancer 140 may be further disposed in a second side end part 145b in the opposite direction of the door 113 among the both side end parts 145a and 145b of the tub 120.

Meanwhile, in the drawing, it is illustrated that the vibration detection unit 197 for detecting the vibration amount of the tub 120 is disposed in the second side end part 145b of the tub 120.

Vibration amount information of the tub 120 detected by the vibration detection unit 197 may be transmitted to the control unit 210.

Figure 3:
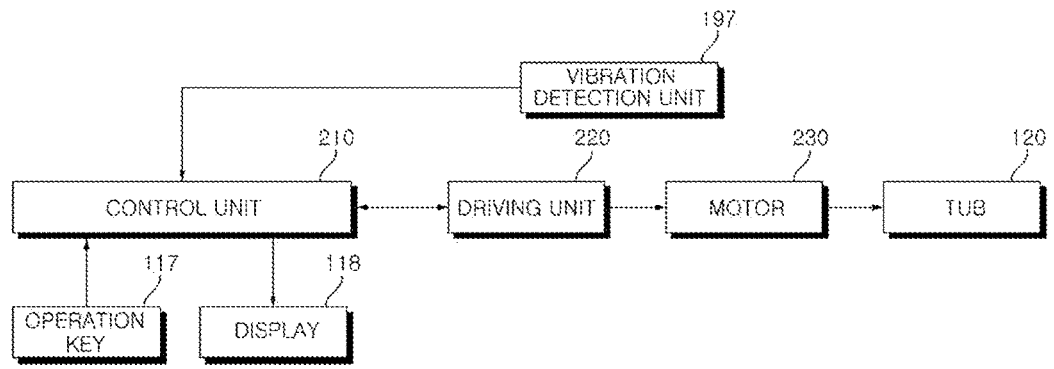
FIG. 3 is an internal block diagram of the laundry treating apparatus of FIG. 1.

FIG. 3 is an internal block diagram of the laundry treating apparatus of FIG. 1.

Referring to the drawing, the laundry treating apparatus 100 may include a motor 230 for rotating the tub 120, a driving unit 220 for driving the motor 230, an operation key 117, a display 118, a vibration detection unit 197 for detecting vibration of the tub 120, and a control unit 210 for controlling each unit in the laundry treating apparatus 100.

In particular, the control unit 210 may control the motor driving unit 220.

The laundry treating apparatus 100 may be controlled by a control operation of the control unit 210. In particular, the control unit 210 may control the motor driving unit 220.

The motor driving unit 220 drives the motor 230. Accordingly, the tub 120 is rotated by the motor 230.

The control unit 210 receives an operation signal from the operation key 117 and operates. Accordingly, washing, rinsing, and dehydration processes may be performed.

In addition, the control unit 210 may control the display 118 to display a washing course, a washing time, a dehydration time, a rinsing time, or a current operation state, or the like.

Meanwhile, the control unit 210 controls the motor driving unit 220, and the motor driving unit 220 controls the motor 230 to operate. At this time, inside or outside the motor 230, a position detection unit for detecting a rotor position of the motor is not provided. That is, the motor driving unit 220 may control the motor 230 by a sensorless scheme.

The motor driving unit 220 is used to drive the motor 230, and may include an output current detection unit (E in FIG. 4) for detecting an output current flowing through an inverter (not shown), an inverter control unit (not shown), and the motor 230. In addition, the motor driving unit 220 may further include a converter or the like that supplies a DC power inputted to the inverter (not shown).

For example, the inverter control unit (430 of FIG. 4) in the motor driving unit 220 estimates the rotor position of the motor 230 based on the output current io. Then, based on the estimated rotor position, the motor 230 is controlled to rotate.

Figure 4:
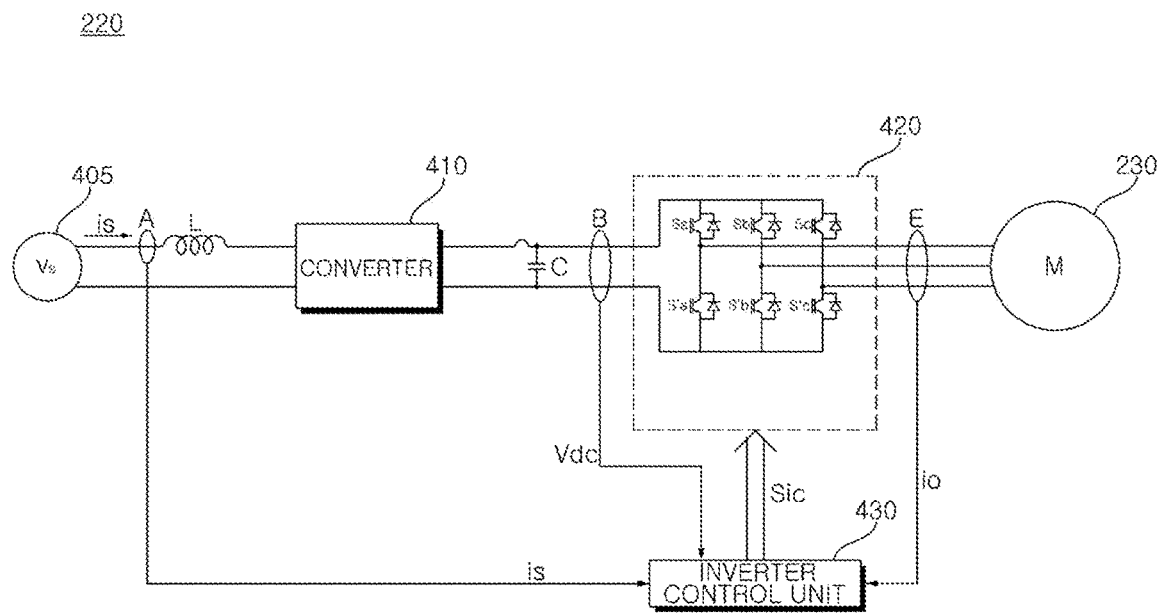
FIG. 4 is an internal circuit diagram of a motor driving unit of FIG. 3.

Specifically, when the inverter control unit 430 of FIG. 4 generates a switching control signal (Sic of FIG. 4) of pulse width modulation (PWM) type, based on the output current io, to output to the inverter (not shown), the inverter (not shown) performs a high speed switching operation to supply AC power of a certain frequency to the motor 230. Then, the motor 230 rotates by the AC power supply of a certain frequency.

The motor driving unit 220 will be described later with reference to FIG. 4.

Meanwhile, the control unit 210 may calculate the amount of cloth, based on the current io, or the like detected by the current detection unit 220. For example, during the rotation of the tub 120, the amount of cloth may be calculated based on the current value io of the motor 230.

Meanwhile, the control unit 210 may detect the amount of the eccentricity of the tub 120, i.e., the unbalance (UB) of the tub 120. Such eccentricity detection may be performed based on the ripple component of the current io detected by the current detection unit 220 or the rotational speed change amount of the tub 120.

Meanwhile, the vibration detection unit 197 may detect the vibration amount of the tub 120. The vibration amount information of the tub 120 detected by the vibration detection unit 197 may be transmitted to the control unit 210.

Meanwhile, the control unit 210 may control the tub 120 to rotate at a first speed in the blanket dehydration mode, to rotate at a second speed lower than the first speed so that a plurality of balls 143aa to 143ae are dispersed, when the amount of the eccentricity in the first speed rotation is equal to or more than a first reference value, and to rotate at a third speed higher than the first speed when the amount of the eccentricity in the second speed rotation is less than or equal to a second reference value. Thus, in the blanket dehydration mode, the plurality of balls 143aa to 143ae are not operated unbalanced, so that dehydration can be stably performed.

Meanwhile, the control unit 210 controls the plurality of balls 143aa to 143ae to rotate at the third speed of the tub 120 in a state where the plurality of balls 143aa to 143ae are dispersed, so that the plurality of balls 143aa to 143ae are not operated unbalanced, thereby stably performing the dehydration.

Meanwhile, in the state where the plurality of balls 143aa to 143ae are dispersed, the control unit 210 increases the speed of the tub 120 so as to pass a transient resonance section, so that the plurality of balls 143aa to 143ae are not operated unbalanced, thereby stably performing the dehydration.

Accordingly, in the transient resonance section, it is possible to prevent a short circuit phenomenon that the tub 120 is stopped due to excessive vibration.

Accordingly, the dehydration time in the blanket dehydration mode can be reduced.

Meanwhile, in the third speed rotation, the control unit 210 controls the tub 120 to stop when the vibration amount of the tub 120 detected by the vibration detection unit 197 is greater than or equal to the third reference value, and to rotate at a fourth speed higher than the third speed when the vibration amount of the tub 120 detected by the vibration detection unit 197 is less than the third reference value.

Meanwhile, the control unit 210 calculates the amount of cloth in the tub 120 in the case of the blanket dehydration mode. The control unit 210 may control the tub 120 to rotate at the second speed lower than the first speed so as to disperse the plurality of balls 143aa to 143ae, when the amount of cloth is equal to or less than a certain value and when the amount of the eccentricity in the first speed rotation is equal to or greater than the first reference value, and to rotate at the third speed higher than the first speed when the amount of the eccentricity in the second speed rotation is equal to or less than the second reference value.

Meanwhile, the control unit 210 may calculate the amount of eccentricity in the first speed rotation, and calculate the amount of cloth before the calculation of the amount of eccentricity.

Meanwhile, the control unit 210 may rotate the tub 120 at the first speed before calculating the amount of eccentricity, and may calculate the amount of cloth in the first speed rotation.

Meanwhile, the control unit 210 may rotate the tub 120 at the first speed so that the cloth is attached to the tub 120.

Meanwhile, in the case of the blanket dehydration mode, the control unit 210 may control the tub 120 to rotate at the first speed, and to rotate at the third speed higher than the first speed when the amount of the eccentricity in the first speed rotation is less than the first reference value.

Meanwhile, in the case of a normal dehydration mode, the control unit 210 may control the tub 120 to rotate at the first speed, and to rotate at the third speed higher than the first speed when the amount of the eccentricity in the first speed rotation is less than or equal to an allowable value.

Meanwhile, according to another embodiment of the present invention, in the case of the blanket dehydration mode, the control unit 210 may control the tub 120 to rotate at the first speed. The control unit 210 may control the tub 120 to rotate at the second speed lower than the first speed so as to disperse the plurality of balls 143aa to 143ae, when the amount of the eccentricity in the first speed rotation is equal to or greater than the first reference value, and to rotate at the third speed higher than the first speed when the amount of the eccentricity in the first speed rotation is less than the first reference value. According to this, in the blanket dehydration mode, the plurality of balls 143aa to 143ae are not operated unbalanced, so that dehydration can be stably performed.

FIG. 4 is an internal circuit diagram of the motor driving unit of FIG. 3.

Referring to the drawing, the motor driving unit 220 according to an embodiment of the present invention is used to drive a sensorless typed motor, and may include a converter 410, an inverter 420, an inverter control unit 430, a dc terminal voltage detection unit B, a smoothing capacitor C, an output current detection unit E, and an output voltage detection unit F. In addition, the motor driving unit 220 may further include an input current detection unit A, a reactor L, and the like.

The reactor L is disposed between a commercial AC power 405 ($v_s$) and the converter 410 to perform power factor correction or boost operation. In addition, the reactor L may serve to restrict harmonic current due to the fast switching of the converter 410.

The input current detection unit A may detect the input current $i_s$ inputted from the commercial AC power 405. To this end, a current transformer (CT), a shunt resistor, or the like may be used as the input current detection unit A. The detected input current $i_s$, as a discrete signal in the form of a pulse, may be inputted to the inverter control unit 430.

The converter 410 converts the commercial AC power 405 which passed through the reactor L into DC power, and outputs it. Although the commercial AC power 405 is shown as a single phase AC power in the drawing, it may be a three phase AC power. The internal structure of the converter 410 also varies according to the type of the commercial AC power 405.

Meanwhile, the converter 410 may be formed of a diode or the like without a switching element, and may perform rectification without a separate switching operation.

For example, in the case of single phase AC power, four diodes may be used in the form of a bridge. In the case of three phase AC power, six diodes may be used in the form of a bridge.

Meanwhile, as the converter 410, for example, a half-bridge type converter in which two switching elements and four diodes are connected may be used, and in the case of the three-phase AC power, six switching elements and six diodes may be used.

When the converter 410 includes a switching element, the boosting operation, the power factor improvement, and the DC power conversion may be performed by the switching operation of a corresponding switching element.

The smoothing capacitor C smoothes and stores the input power. In the drawing, a single element is illustrated as the smoothing capacitor C, but a plurality of elements may be provided to ensure device stability.

Meanwhile, in the drawing, it is illustrated as being connected to the output terminal of the converter 410, but not limited thereto, and DC power may be directly inputted. For example, DC power from a solar cell may be inputted directly to the smoothing capacitor C or may be DC/DC converted and inputted. Hereinafter, the parts illustrated in the drawings will be mainly described.

Meanwhile, since the DC power is stored in both ends of the smoothing capacitor C, this may be referred to as a dc terminal or a dc link terminal.

The dc terminal voltage detection unit B may detect a voltage Vdc of the dc terminal that is both terminals of the smoothing capacitor C. To this end, the dc terminal voltage detection unit B may include a resistance element, an amplifier, and the like. The detected dc terminal voltage Vdc may be inputted to the inverter control unit 430 as a discrete signal in the form of a pulse.

The inverter 420 includes a plurality of inverter switching elements, and may convert the smoothed DC power Vdc into three-phase AC power va, vb, vc of a certain frequency by turning on/off the switching element, and may output to the three-phase synchronous motor 230.

In the inverter 420, an upper arm switching element Sa, Sb, Sc and a lower arm switching element S'a, S'b, S'c, which are connected in series with each other forms a pair, and a total of three pairs of upper and lower arm switching elements are connected in parallel with each other (Sa&S'a, Sb&S'b, Sc&S'c). Diodes are connected in anti-parallel to each of the switching elements Sa, Sa, Sb, S'b, Sc, and S'c.

The switching elements in the inverter 420 perform the on/off operation of the respective switching elements based on the inverter switching control signal Sic from the inverter control unit 430. Thus, the three-phase AC power having a certain frequency is outputted to the three-phase synchronous motor 230.

The inverter control unit 430 may control the switching operation of the inverter 420, based on a sensorless method. To this end, the inverter control unit 430 may receive an output current io detected by the output current detection unit E and an output voltage vo detected by the output voltage detection unit F.

The inverter control unit 430 outputs an inverter switching control signal Sic to the inverter 420 to control the switching operation of the inverter 420. The inverter switching control signal Sic is a switching control signal of the pulse width modulation (PWM) method, and is generated and outputted based on the output current io detected by the output current detection unit E and the output voltage vo detected by the output voltage detection unit F.

The output current detection unit E detects the output current io flowing between the inverter 420 and the three-phase motor 230. That is, the current flowing through the motor 230 is detected. The output current detection unit E may detect all of the output current ia, ib, and is of each phase, or may detect the output currents of two phases by using three-phase equilibrium.

The output current detection unit E may be positioned between the inverter 420 and the motor 230, and a current transformer (CT), a shunt resistor, or the like may be used for current detection.

When a shunt resistor is used, three shunt resistors can be positioned between the inverter 420 and the synchronous motor 230, or one end can be connected to each of the three lower arm switching elements S'a, S'b, S'c of the inverter 420. Meanwhile, two shunt resistors can be used by using three-phase equilibrium. Meanwhile, when a single shunt resistor is used, a corresponding shunt resistor can be disposed between the above-mentioned capacitor C and the inverter 420.

The detected output current io may be applied to the inverter control unit 430 as a discrete signal in the form of a pulse, and the inverter switching control signal Sic is generated based on the detected output current io. Hereinafter, it may be described in parallel that the detected output current io is the three-phase output current ia, ib, ic.

Meanwhile, the three-phase motor 230 is provided with a stator and a rotor, and each phase AC power of a certain frequency is applied to the coil of the stator of each phase (a, b, c phase), so that the rotor rotates.

Such a motor 230 may include, for example, a Surface-Mounted Permanent-Magnet Synchronous Motor (SMPMSM), an Interior Permanent Magnet Synchronous Motor (IPMSM), a Synchronous Reluctance Motor (Synrm), and the like. Among these, the SMPMSM and the IPMSM are a Permanent-Magnet Synchronous Motor (PMSM) to which permanent magnet is applied, and the Synrm has no permanent magnet.

Meanwhile, when the converter 410 includes a switch element, the inverter control unit 430 may control the switching operation of the switching element in the converter 410. To this end, the inverter control unit 430 may receive an input current detected by the input current detection unit A. In addition, the inverter control unit 430 may output the converter switching control signal Scc to the converter 410 in order to control the switching operation of the converter 410. Such a converter switching control signal Scc is a switching control signal of the pulse width modulation PWM method, and may be generated and outputted based on the input current detected from the input current detection unit A.

Figure 5:
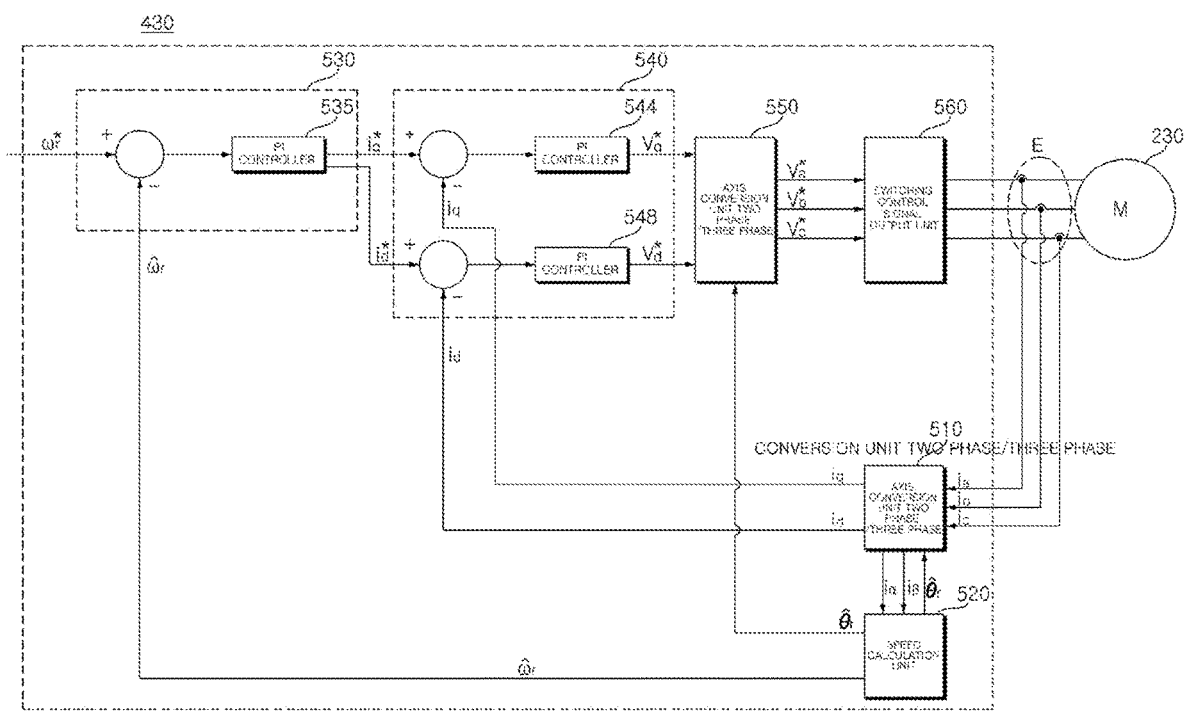
FIG. 5 is an internal block diagram of an inverter control unit of FIG. 4.

FIG. 5 is an internal block diagram of an inverter control unit of FIG. 4.

Referring to FIG. 5, the inverter control unit 430 may include an axis conversion unit 510, a speed calculation unit 520, a current command generation unit 530, a voltage command generation unit 540, an axis conversion unit 550, and a switching control signal output unit 560.

The axis conversion unit 510 may receive the output current (ia, ib, ic) detected by the output current detection unit E, and covert into two-phase current (i$\alpha$, i$\beta$) of a stationary coordinate system and two-phase current (id, iq) of a rotary coordinate system.

Meanwhile, the axis conversion unit 510 may output the two-phase current (i$\alpha$, i$\beta$) of the stationary coordinate system, the two-phase voltage (v$\alpha$, v$\beta$) of the stationary coordinate system, the two-phase current (id, iq) of the rotary coordinate system, and the two-phase voltage (vd, vq) of the rotary coordinate system, which are converted, to the outside.

The speed calculation unit 520 may receive the two-phase current (i$\alpha$, i$\beta$) of the stationary coordinate system and the two-phase voltage (v$\alpha$, v$\beta$) of the stationary coordinate system, which are axis-converted, from the axis conversion unit 510, and calculate the rotor position $\theta$ and the speed $\omega$ of the motor 230.

Meanwhile, the current command generation unit 530 generates the current command value $i^*_q$, based on the operation speed $\hat{\omega}_r$ and the speed command value $\omega^*_r$. For example, the current command generation unit 530 may perform the PI control in a PI control unit 535, and generate the current command value $i^*_q$, based on the difference between the operation speed $\hat{\omega}_r$ and the speed command value $\omega^*_r$. In the drawing, although the q-axis current command value $i^*_q$ is illustrated as a current command value, unlike the drawing, it is also possible to generate a d-axis current command value $i^*_d$. Meanwhile, the value of the d-axis current command value $i^*_d$ may be set to zero.

Meanwhile, the current command generation unit 530 may further include a limiter (not shown) for restricting the level so that the current command value $i^*_q$ does not exceed an allowable range.

Next, the voltage command generation unit 540 may generate the d-axis and q-axis voltage command values $v^*_d$ and $v^*_q$, based on the d-axis and q-axis currents (id, iq) axially converted from the axis conversion unit to the two-phase rotary coordinate system, and the current command value $i^*_d$, $i^*_q$ in the current command generation unit 530, or the like. For example, the voltage command generation unit 540 may perform the PI control in the PI control unit 544, and generate the q-axis voltage command value $v^*_q$, based on the difference between the q-axis current $i_q$ and the q-axis current command value $i^*_q$. In addition, the voltage command generation unit 540 may perform the PI control in the PI control unit 548, and generate the d-axis voltage command value $v^*_d$, based on the difference between the d-axis current id and the d-axis current command value $i^*_d$. Meanwhile, the value of the d-axis voltage command value $v^*_d$ may be set to zero, in correspondence with the case where the value of the d-axis current command value $i^*_d$ is set to zero.

Meanwhile, the voltage command generation unit 540 may further include a limiter (not shown) for restricting the level so that the d-axis and q-axis voltage command values $v^*_d$ and $v^*_q$ do not exceed the allowable range.

Meanwhile, the generated d-axis and q-axis voltage command values $v^*_d$ and $v^*_q$ may be inputted to the axis conversion unit 550.

The axis conversion unit 550 receives the calculation position $\hat{\theta}_r$, and the d-axis and q-axis voltage command values $v^*_d$ and $v^*_q$ from the speed calculation unit 520, and performs the axis conversion.

First, the axis conversion unit 550 converts the two-phase rotary coordinate system into the two-phase stationary coordinate system. At this time, the calculation position $\hat{\theta}_r$ may be used in the speed calculation unit 520.

In addition, the axis conversion unit 550 converts the two-phase stationary coordinate system into the three-phase stationary coordinate system. Through such a conversion, an axis conversion unit 1050 may output the three-phase output voltage command value $v^*_a$, $v^*_b$, $v^*_c$.

The switching control signal output unit 560 generates and outputs an inverter switching control signal Sic in accordance with the pulse width modulation PWM method, based on the three-phase output voltage command value $v^*_a$, $v^*_b$, $v^*_c$.

The outputted inverter switching control signal Sic may be converted into a gate driving signal by a gate driving unit (not shown) and inputted to the gate of each switching element in the inverter 420. Thus, each of the switching elements Sa, S'a, Sb, S'b, Sc, S'c inside the inverter 420 may perform a switching operation.

Figure 6A:
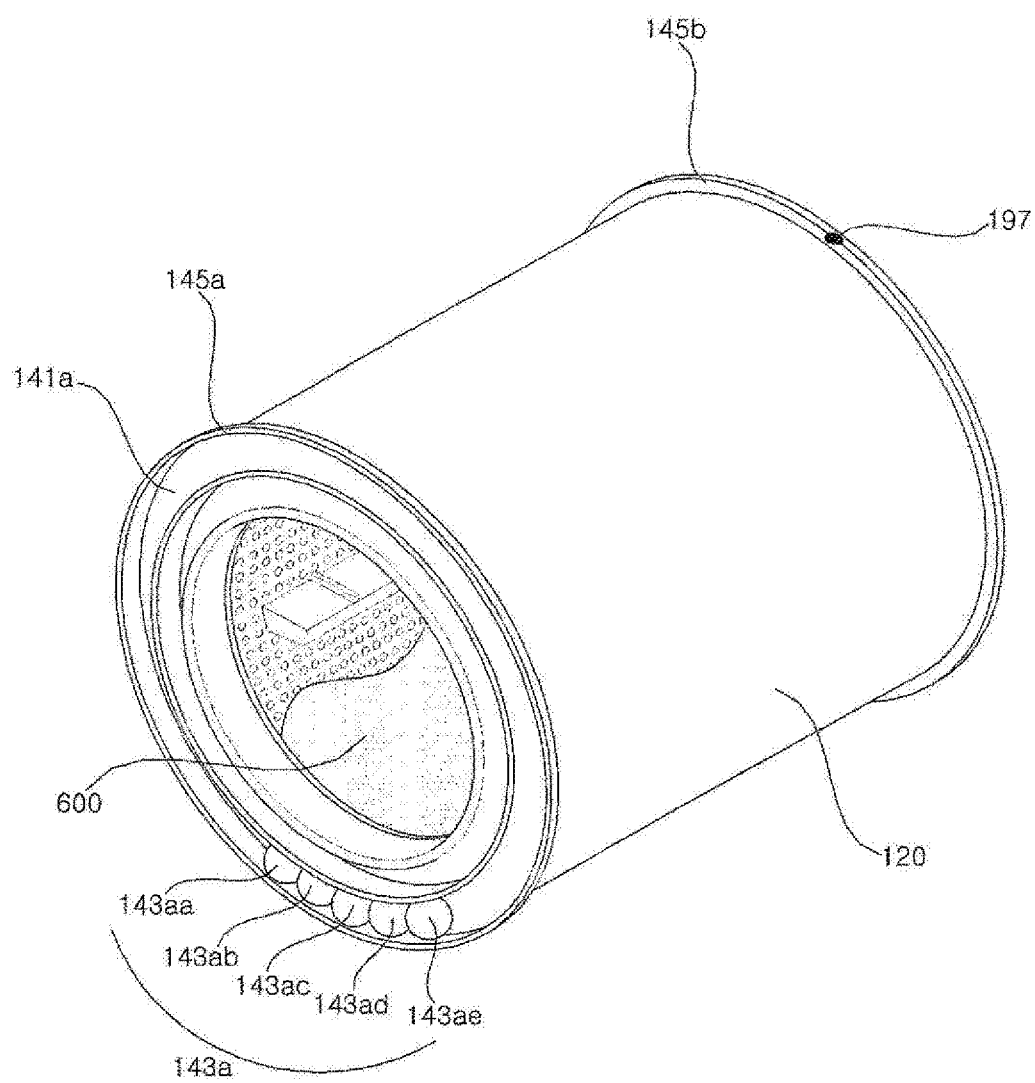
FIGS. 6A to 6C are diagrams for explaining a blanket dehydration mode.
Figure 6B:
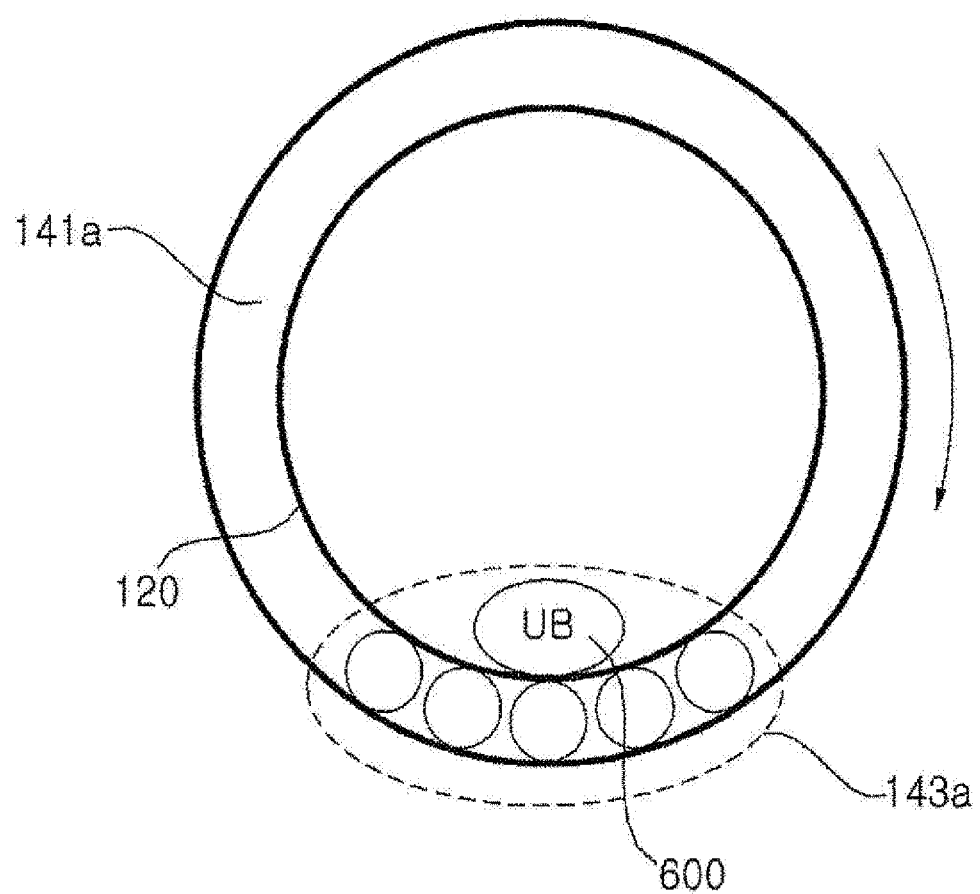
Figure 6C:
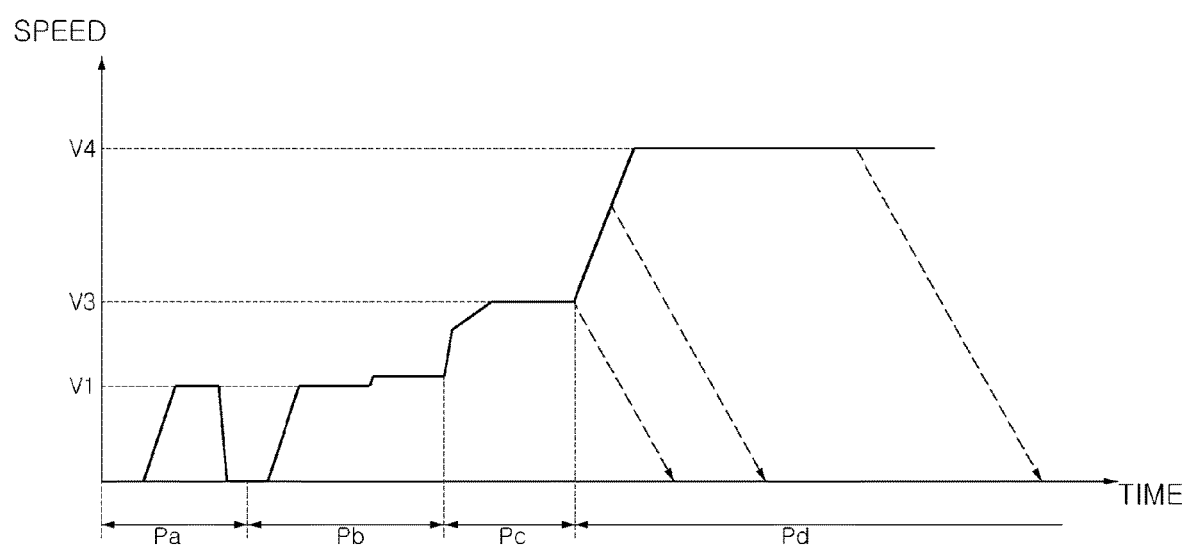

FIGS. 6A to 6C are diagrams for explaining a blanket dehydration mode.

First, FIG. 6A illustrates that a blanket 600, which has a large volume and little moves in the tub 120, is inserted into the tub 120.

Blanket has a large volume, but has a small amount of cloth. In particular, the amount of cloth of the blanket 600 may be less than or equal to a certain value.

Typically, the cloth and the plurality of balls 143*aa* to 143*ae* inside the ball balancer are spaced apart in opposite directions and rotated, but in the case of a blanket having a large volume and little movement in the tub 120, as shown in FIG. 6B, the cloth 600 and the plurality of balls 143*aa* to 143*ae* are disposed in the same position and rotated.

That is, since the plurality of balls 143*aa* to 143*ae* are agglomerated around the cloth 600 and rotated, the balls are operated in an unbalanced manner, rather than operated as a balancer.

Accordingly, when increasing the speed of the tub 120, due to excessive vibration, short circuit or step out occurs, thereby causing a problem that the rotation of the tub 120 must be stopped.

FIG. 6C illustrates that a short circuit occurs due to excessive vibration during the third speed V3 rotation in the Pc section, a short circuit occurs due to excessive vibration in a speed increasing section from the third speed V3 to the fourth speed V4, or a short circuit occurs due to excessive vibration during the fourth speed V4 rotation.

That is, since the plurality of balls 143*aa* to 143*ae* operate unbalanced in the transient resonance section, it become unstable when the blanket is dehydrated.

Accordingly, the present invention suggests a method of stably performing dehydration by allowing the plurality of balls 143*aa* to 143*ae* not to operate unbalanced, in the blanket dehydration mode. This will be described with reference to FIG. 7 or below.

Figure 7:
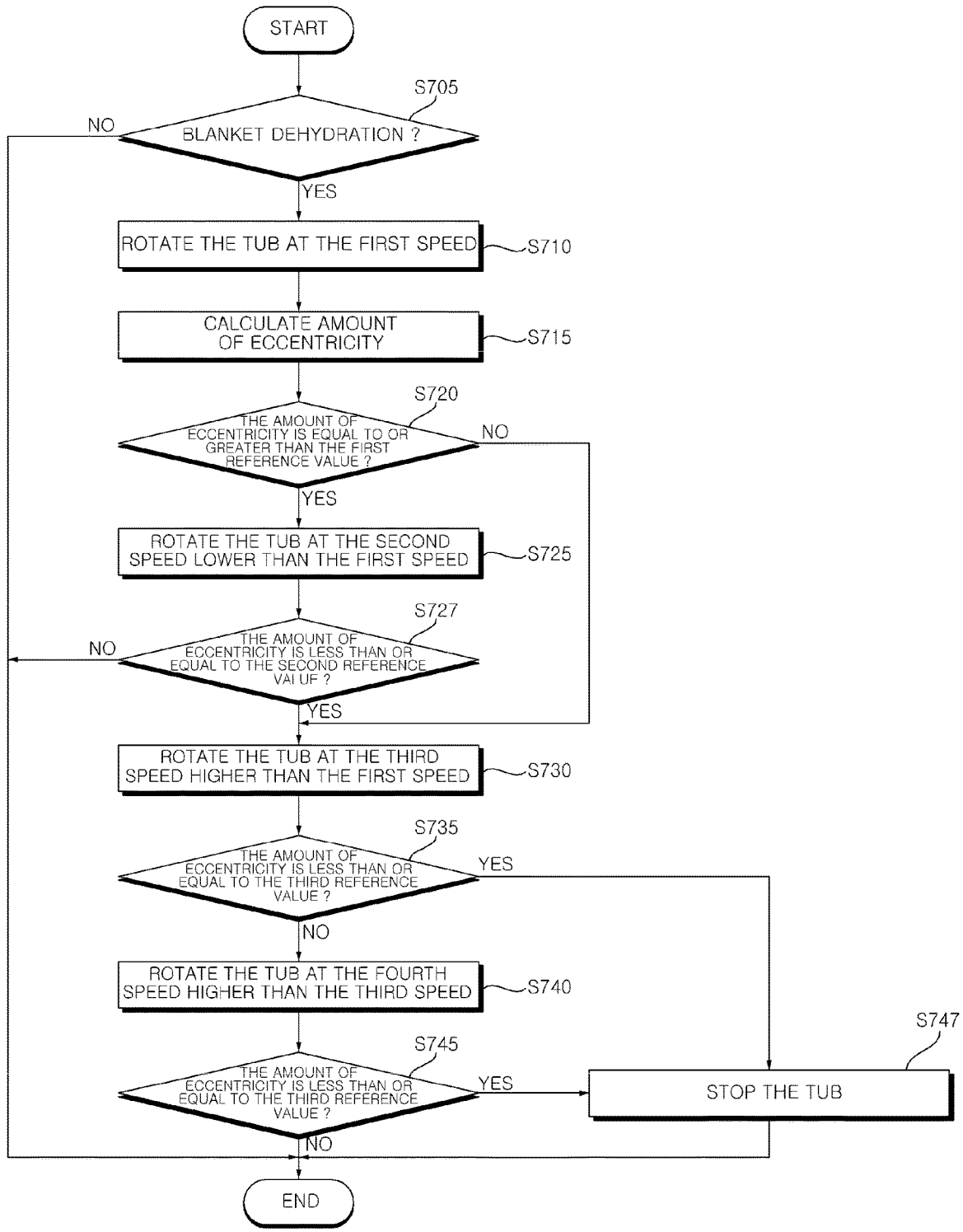
FIG. 7 is a flowchart illustrating an operation method of a laundry treating apparatus according to an embodiment of the present invention.
Figure 8:
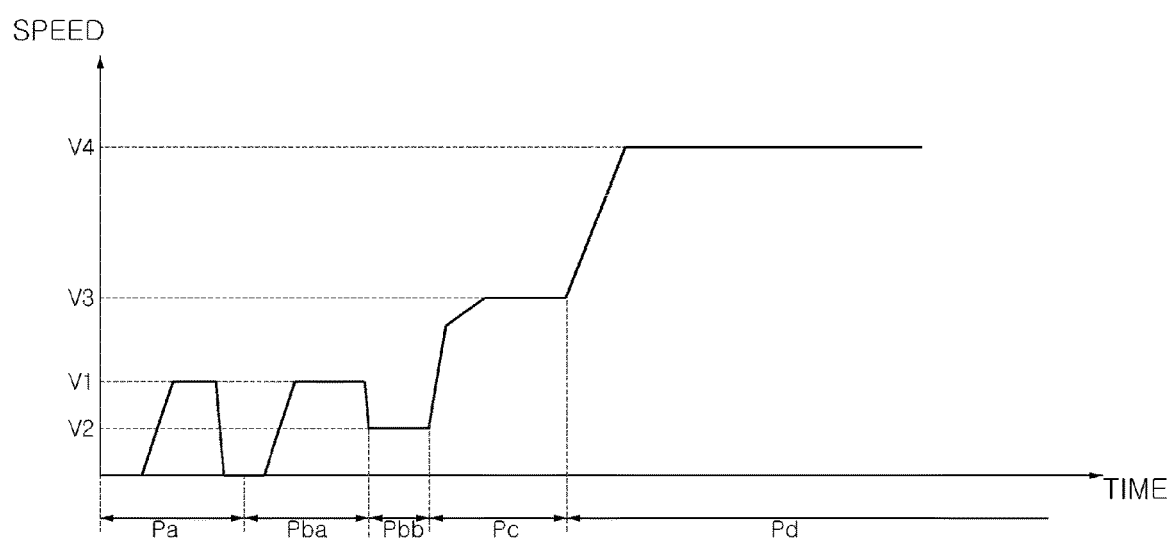
FIGS. 8 to 10 are diagrams for explaining the operation method of FIG. 7.
Figure 9:
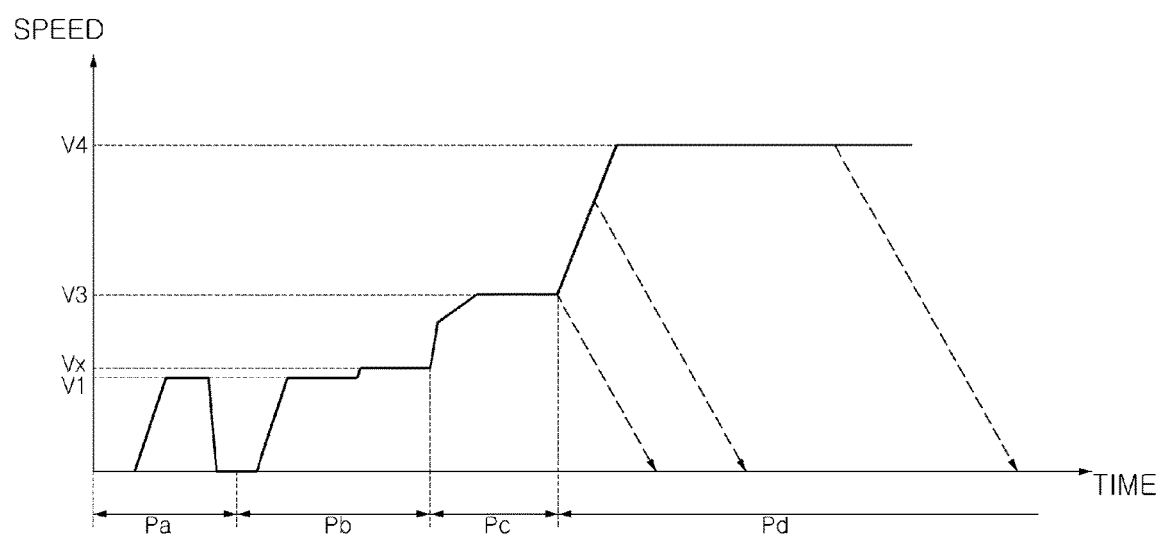
Figure 10:
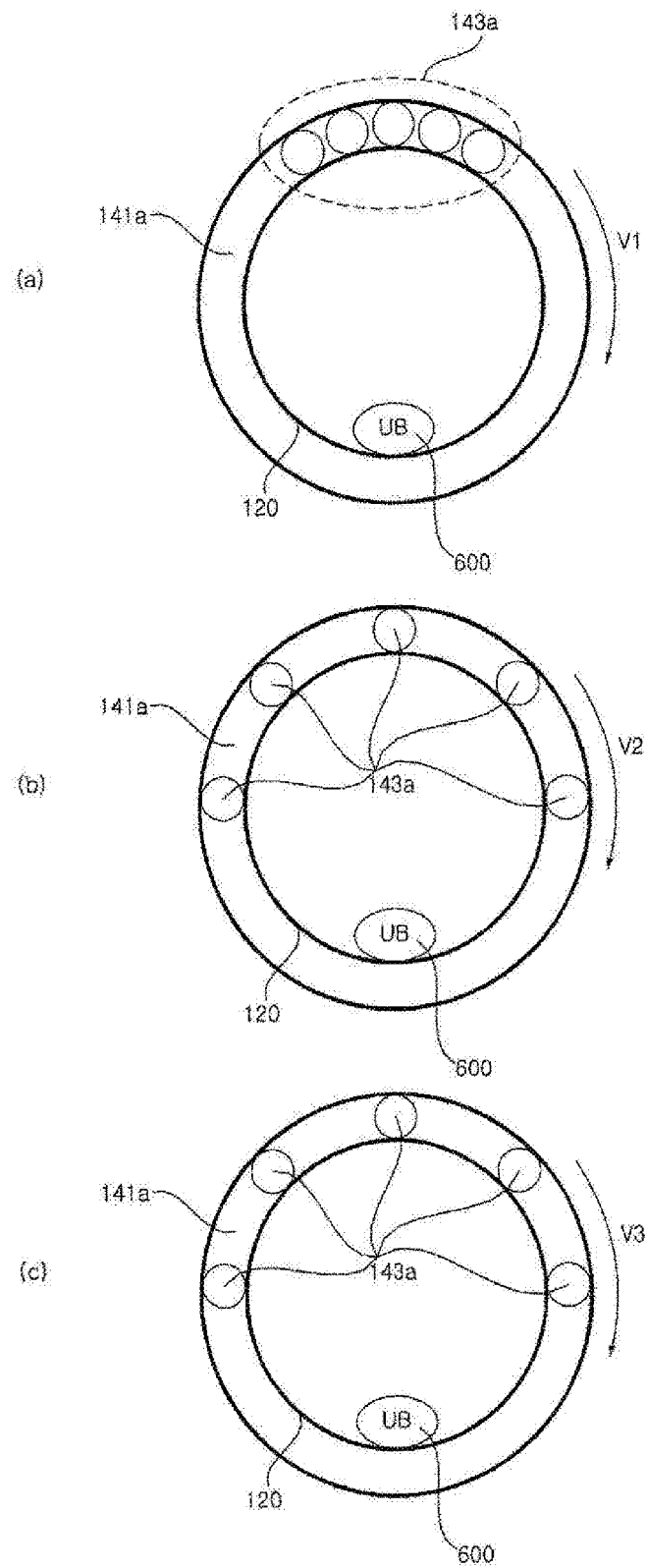

FIG. 7 is a flowchart illustrating an operation method of a laundry treating apparatus according to an embodiment of the present invention, and FIGS. 8 to 10 are diagrams for explaining the operation method of FIG. 7.

First, the control unit 210 determines whether it is the blanket dehydration mode (S705). For example, user may set the blanket dehydration mode by using the operation key 117 or the like.

That is, the control unit 210 may determine whether the blanket dehydration mode is set by input of the operation key 117.

Meanwhile, instead, after rotating the tub 120, the control unit 210 may control to enter the blanket dehydration mode automatically, based on the detected cloth amount and the amount of vibration detected by the vibration detection unit 197.

For example, when the cloth amount is less than or equal to a certain value and the amount of eccentricity is greater than or equal to the first reference value, the control unit 210 may determine that the cloth inserted into the tub 120 is a blanket, and may control to automatically enter the blanket dehydration mode.

Meanwhile, in the blanket dehydration mode, the control unit 210 may rotate the tub 120 at the first speed, and calculate the cloth amount based on the first speed V1 rotation.

FIG. 8 illustrates that the tub 120 rotates at the first speed V1 during a Pa period. Accordingly, the control unit 210 may calculate the cloth amount, based on the first speed V1 rotation of the tub 120 during the Pa period.

Meanwhile, in the blanket dehydration mode, the control unit 210 may rotate the tub 120 at the first speed (S710), and may calculate the amount of eccentricity based on the first speed V1 rotation (S715).

FIG. 8 illustrates that the tub 120 rotates at the first speed V1 during a Pba period. Thus, the control unit 210 may calculate the amount of eccentricity based on the first speed V1 rotation of the tub 120 during the Pba period.

Meanwhile, FIG. 10A illustrates that during the first speed V1 rotation of the tub 120, the plurality of balls 143*aa* to 143*ae* are agglomerated and rotated.

Meanwhile, the first speed V1 may range from about 100 and 110 rpm.

Next, when the amount of eccentricity in the first speed V1 rotation is greater than or equal to the first reference value (S720), the control unit 210 controls the tub 120 to rotate at the second speed V2 lower than the first speed V1 so that the plurality of balls 143*aa* to 143*ae* are dispersed (S725).

FIG. 8 illustrates that the tub 120 rotates at the second speed V2 during a Pbb period.

Meanwhile, FIG. 10B illustrates that a plurality of balls 143*aa* to 143*ae* are dispersed and rotated, during the second speed V2 rotation of the tub 120.

Meanwhile, at step 720 (S720), when the calculated amount of eccentricity is greater than or equal to the allowable value, the control unit 210 may control to stop the rotation of the tub 120 so as to prevent the step out of the tub 120, without a separate operation.

Meanwhile, the second speed V2 may range from about 70 to 90 rpm.

Next, the control unit 210 calculates the amount of eccentricity in the second speed V2 rotation, and determines whether the amount of eccentricity in the second speed V2 rotation is less than or equal to the second reference value (S727). If applicable, the control unit 210 may control the tub 120 to rotate at the third speed V3 higher than the first speed V1 (S730).

In particular, the control unit 210 may control the plurality of balls 143*aa* to 143*ae* to rotate at the third speed V3 of the tub 120 in the state in which the plurality of balls 143*aa* to 143*ae* are dispersed.

In particular, the control unit 210 allows the plurality of balls 143*aa* to 143*ae* not to operate unbalanced, thereby performing dehydration stably.

Meanwhile, the second reference value may be higher than the first reference value. That is, since the amount of eccentricity became small as the unbalance, or the like is eliminated due to the second speed V2 rotation, in the case of the second reference value or less, the control unit 210 may control the tub 120 to rotate at the third speed V3 higher than the first speed V1.

FIG. 8 illustrates that the tub 120 rotates at the third speed V3 during the Pc period.

Meanwhile, FIG. 10C illustrates that the plurality of balls 143aa to 143ae are dispersed and rotated, during the third speed V3 rotation of the tub 120.

In particular, the control unit 210 increases the speed of the tub 120 so as to pass through the transient resonance section in a state where the plurality of balls 143aa to 143ae are dispersed, so that the plurality of balls 143aa to 143ae are not operated unbalanced, thereby stably performing dehydration.

Accordingly, in the transient resonance section, it is possible to prevent the short circuit phenomenon that the tub 120 is stopped due to the excessive vibration. As a result, the dehydration time in the blanket dehydration mode can be reduced. In addition, since the excessive vibration is reduced, noise is little generated.

Meanwhile, the third speed V3 may range from about 350 to 400 rpm.

Next, during the third speed V3 rotation, when the amount of vibration detected by the vibration detection unit 197 is equal to or greater than the third reference value (S735), the control unit 210 controls the tub 120 to stop (S747).

Meanwhile, during the third speed V3 rotation, when the amount of vibration detected by the vibration detection unit 197 is less than the third reference value, the control unit 210 controls the tub 120 to rotate at the fourth speed V4 higher than the third speed V3 (S740).

Thus, in the blanket dehydration mode, the plurality of balls 143aa to 143ae are not operated unbalanced, so that dehydration can be stably performed.

FIG. 8 illustrates that the tub 120 rotates at the fourth speed V4 during the Pd period.

Next, during the fourth speed V4 rotation, when the amount of vibration detected by the vibration detection unit 197 is equal to or greater than the third reference value (S745), the control unit 210 controls the tub 120 to stop (S747).

Meanwhile, in the blanket dehydration mode, the control unit 210 may control the tub 120 to rotate at the first speed V1 and, when the amount of eccentricity in the first speed V1 rotation is less than the first reference value, to rotate at the third speed V3 higher than the first speed V1.

That is, it may control to perform step 730 (S730) immediately, when the amount of eccentricity in the first speed V1 rotation is less than the first reference value at step 720 (S720) of FIG. 7. Accordingly, dehydration may proceed intactly without separate dispersing operations of the plurality of balls 143aa to 143ae. Therefore, when the amount of eccentricity is small, dehydration may proceed quickly, without the second speed V2 rotation.

Next, in the normal dehydration mode, the control unit 210 may control the tub 120 to rotate at the first speed V1 and, when the amount of eccentricity in the first speed V1 rotation is equal to or less than the allowable value, to rotate at the third speed V3 higher than the first speed V1.

FIG. 9 is a diagram illustrating an example of the rotation speed of the tub 120 in the normal dehydration mode.

The period Pa of FIG. 9 is a cloth amount calculation period, and the cloth amount in the first speed V1 rotation may be calculated.

Next, the period Pb of FIG. 9 is an eccentricity detection period, and the cloth amount in the first speed V1 rotation may be calculated. Meanwhile, during the Pb period, the tub 120 may rotate at a Vx speed slightly higher than the first speed V1.

Next, the period Pc in FIG. 9 is a third speed V3 rotation period, and when the amount of eccentricity is less than or equal to the allowable value, the rotation speed may increase to the fourth speed V4, as in the Pd period.

Meanwhile, during the third speed V3 rotation period, during the fourth speed V4 rotation period, or during the speed increase period from the third speed V3 to the fourth speed V4, when the amount of eccentricity is equal to or larger than the allowable value, the rotation of the tub 120 may be stopped.

Figure 11:
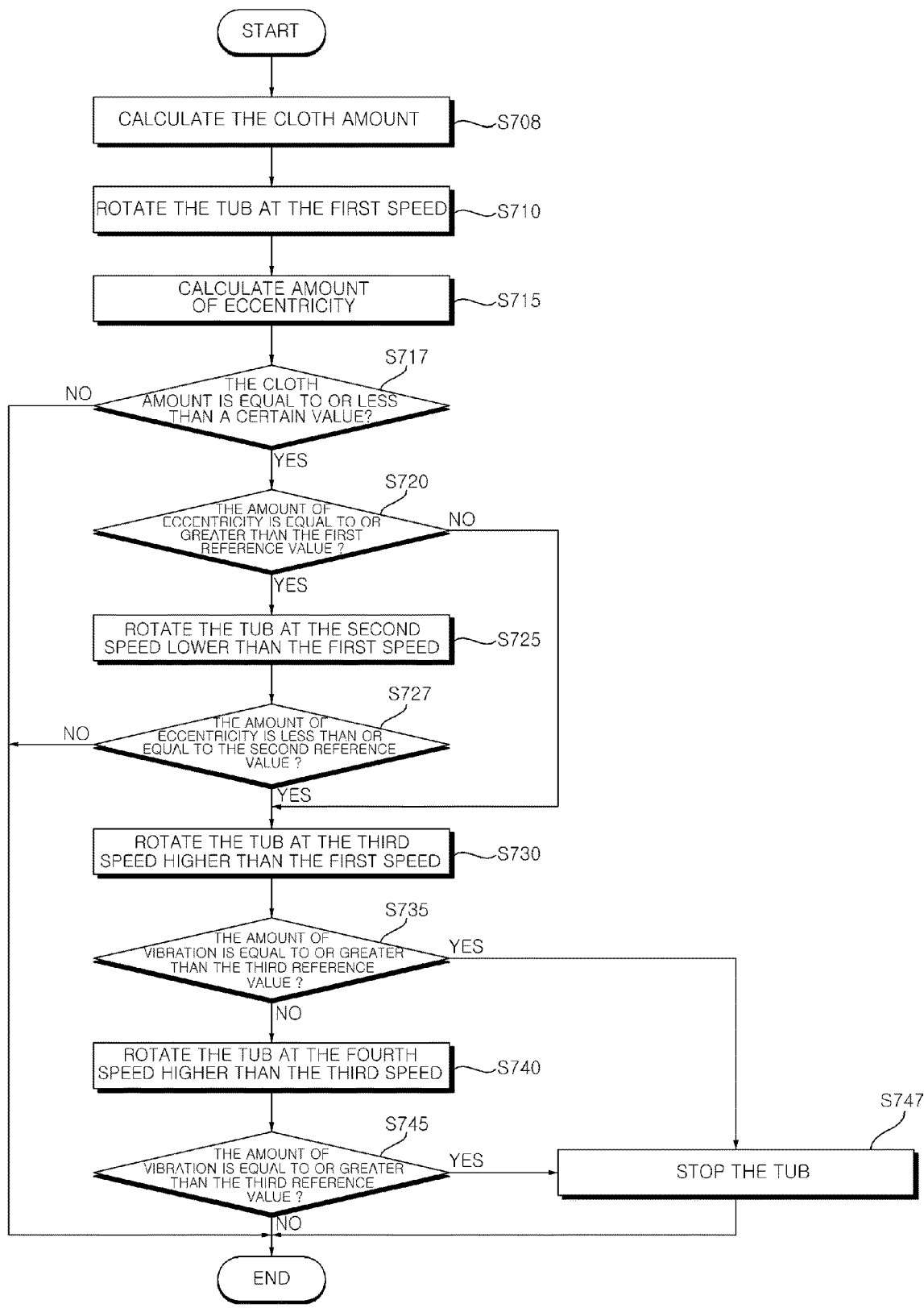
FIG. 11 is a flowchart illustrating an operation method of a laundry treating apparatus according to another embodiment of the present invention.

FIG. 11 is a flowchart illustrating an operation method of a laundry treating apparatus according to another embodiment of the present invention.

The operation method of FIG. 11 is similar to the operation method of FIG. 7 except that step 708 (S708) and step 717 (S717) are further performed.

After step 705 (S705), the control unit 210 may calculate the cloth amount (S708)

FIG. 8 illustrates that the tub 120 rotates at the first speed V1 during the Pa period. Accordingly, the control unit 210 may calculate the cloth amount, based on the first speed V1 rotation of the tub 120, during the Pa period.

Meanwhile, after step 717 (S717), when the cloth amount is less than or equal to a certain value, and when the amount of eccentricity in the first speed V1 rotation is equal to or greater than the first reference value (S720), the control unit 210 controls the tub 120 to rotate at the second speed V2 lower than the first speed V1 so that the plurality of balls 143aa to 143ae are dispersed (S725).

FIG. 8 illustrates that the tub 120 rotates at the second speed V2 during the Pbb period.

Meanwhile, FIG. 10B illustrates that the plurality of balls 143aa to 143ae are dispersed and rotated, during the second speed V2 rotation of the tub 120.

As described above, in a blanket washing mode, when the cloth amount is less than or equal to a certain value, the tub 120 may be controlled to rotate at the second speed V2 so that the plurality of balls 143aa to 143ae are dispersed.

Accordingly, the control unit 210 can stably perform dehydration by allowing the plurality of balls 143aa to 143ae not to be operated unbalanced.

The laundry treating apparatus according to the embodiment of the present invention is not limited to the configuration and method of the embodiments described above, but all or some of the embodiments may be selectively combined so that various modifications can be achieved.

Meanwhile, the operation method of the laundry treating apparatus of the present invention can be implemented as a processor-readable code on a processor-readable recording medium provided in the laundry treating apparatus. The processor-readable recording medium includes all kinds of recording devices that store data that can be read by the processor.

Although the exemplary embodiments of the present invention have been disclosed for illustrative purposes, those skilled in the art will appreciate that various modifications, additions and substitutions are possible, without departing from the scope and spirit of the invention as disclosed in the accompanying claims. Accordingly, the scope of the present invention is not construed as being limited to the described embodiments but is defined by the appended claims as well as equivalents thereto.

INDUSTRIAL APPLICABILITY

The present invention is applicable to a laundry treating apparatus, and more particularly, to a laundry treating apparatus capable of stably performing dehydration by preventing a plurality of balls from being unbalanced in the blanket dehydration mode.

The invention claimed is:

1. A laundry treating apparatus comprising:
    a casing;
    a tub disposed in the casing and configured to receive laundry;
    a ball balancer disposed in at least one side of the tub, the ball balancer comprising a plurality of balls and a guide part that is configured to guide movement of the plurality of balls;
    a door attached to the casing and configured to be opened and closed;
    a motor configured to rotate the tub; and
    a control unit configured to:
        control the tub to rotate at a first speed in a blanket dehydration mode, wherein the plurality of balls are configured to, based on the tub rotating at the first speed, gather and rotate along the guide part,
        control the tub to rotate at a second speed lower than the first speed based on an amount of eccentricity of the laundry in the tub becoming greater than or equal to a first reference value while the tub rotates at the first speed, wherein the plurality of balls are configured to, based on the tub rotating at the second speed, separate from one another and rotate along the guide part, and
        control the tub to rotate at a third speed higher than the first speed based on the amount of eccentricity of the laundry in the tub becoming less than or equal to a second reference value while the tub rotates at the second speed, wherein the plurality of balls are configured to, based on the tub rotating at the third speed, separate from one another and rotate along the guide part.

2. The laundry treating apparatus of claim 1, wherein the control unit is configured to increase a speed of the tub to pass through a transient resonance section, in a state in which the plurality of balls are dispersed.

3. The laundry treating apparatus of claim 1, further comprising a vibration detection unit configured to detect vibration of the tub,
    wherein the control unit is configured to:
        control the tub to stop based on a vibration amount of the tub detected by the vibration detection unit being greater than or equal to a third reference value while the tub rotating at the third speed, and
        control the tub to rotate at a fourth speed higher than the third speed based on the vibration amount of the tub detected by the vibration detection unit being less than the third reference value.

4. The laundry treating apparatus of claim 1, wherein the control unit is configured to:
    determine a cloth amount in the tub in the blanket dehydration mode,
    control the tub to rotate at the second speed lower than the first speed based on the cloth amount being less than or equal to a certain value and the amount of eccentricity becoming greater than or equal to the first reference value while the tub rotates at the first speed.

5. The laundry treating apparatus of claim 4, wherein the control unit is configured to:
    determine the amount of eccentricity while the tub rotates at the first speed, and
    determine the cloth amount before determining the amount of eccentricity.

6. The laundry treating apparatus of claim 4, wherein the control unit is configured to:
    rotate the tub at the first speed before determining the amount of eccentricity, and
    determine the cloth amount while the tub rotates at the first speed.

7. The laundry treating apparatus of claim 1, wherein the control unit is configured to rotate the tub at the first speed to allow the laundry to be attached to the tub.

8. The laundry treating apparatus of claim 1, wherein the control unit is configured to control the tub to rotate at the third speed higher than the first speed based on the amount of eccentricity becoming less than the first reference value while the tub rotates at the first speed.

9. The laundry treating apparatus of claim 1, wherein the control unit is configured to:
    control the tub to rotate at the first speed a normal dehydration mode, and
    control the tub to rotate at the third speed higher than the first speed based on the amount of eccentricity becoming less than or equal to an allowable value while the tub rotates at the first speed in the normal dehydration mode.

10. The laundry treating apparatus of claim 1, wherein a distance between the plurality of balls while the tub rotates at the first speed is less than a distance between the plurality of balls while the tub rotates at the second speed or the third speed.

11. The laundry treating apparatus of claim 1, wherein the second reference value is greater than the first reference value.

12. A laundry treating apparatus comprising:
    a casing;
    a tub disposed in the casing and configured to receive laundry;
    a ball balancer disposed in at least one side of the tub, the ball balancer comprising a plurality of balls and a guide part that is configured to guide movement of the plurality of balls;
    a door attached to the casing and configured to be opened and closed;
    a motor configured to rotate the tub; and
    a control unit configured to:
        control the tub to rotate at a first speed in a blanket dehydration mode, wherein the plurality of balls are configured to, based on the tub rotating at the first speed, gather and rotate along the guide part,
        control the tub to rotate at a second speed lower than the first speed based on an amount of eccentricity becoming greater than or equal to a first reference value while the tub rotates at the first speed, wherein the plurality of balls are configured to, based on the tub rotating at the second speed, be spaced apart from one another and rotate along the guide part, and
        control the tub to rotate at a third speed higher than the first speed based on the amount of eccentricity becoming less than the first reference value while the tub rotates at the first speed, wherein the plurality of balls are configured to, based on the tub rotating at the third speed, be spaced apart from one another and rotate along the guide part.

13. The laundry treating apparatus of claim 12, further comprising a vibration detection unit configured to detect vibration of the tub,
    wherein the control unit is configured to:
        control the tub to rotate at the third speed higher than the first speed based on the amount of eccentricity becoming less than or equal to a second reference value while the tub rotates at the second speed, and control the tub to rotate at a fourth speed higher than the third speed based on a vibration amount of the tub detected by the vibration detection unit being less than a third reference value.

14. The laundry treating apparatus of claim 13, wherein the control unit is configured to increase a speed of the tub to pass through a transient resonance section, in a state in which the plurality of balls are dispersed.

15. The laundry treating apparatus of claim 13, wherein the second reference value is greater than the first reference value.

16. The laundry treating apparatus of claim 12, wherein a distance between the plurality of balls while the tub rotates at the first speed is less than a distance between the plurality of balls while the tub rotates at the second speed or the third speed.

* * * * *